United States Patent [19]

Suh et al.

[11] 4,217,113

[45] Aug. 12, 1980

[54] ALUMINUM OXIDE-CONTAINING METAL COMPOSITIONS AND CUTTING TOOL MADE THEREFROM

[75] Inventors: Nam P. Suh, Sudbury; Paul D. Fillion, Cambridge, both of Mass.; Sang H. Lee, St. Paul, Minn.

[73] Assignee: Massachusetts Institute of Technology, Cambridge, Mass.

[21] Appl. No.: 10,296

[22] Filed: Feb. 8, 1979

Related U.S. Application Data

[63] Continuation of Ser. No. 806,239, Jun. 13, 1977, abandoned.

[51] Int. Cl.$^2$ .............................................. B24D 3/08
[52] U.S. Cl. ........................................ 51/309; 106/57; 106/65; 106/66
[58] Field of Search .................. 51/309, 308, 307; 106/65, 57, 66

[56] References Cited

U.S. PATENT DOCUMENTS

| | | | |
|---|---|---|---|
| 2,271,368 | 1/1942 | Fulcher et al. | 51/309 |
| 2,279,260 | 4/1942 | Benner et al. | 51/309 |
| 2,369,709 | 2/1945 | Baumann et al. | 51/309 |
| 2,782,110 | 2/1957 | Cantrell et al. | 51/309 |
| 3,847,568 | 11/1974 | Cihon et al. | 51/308 |
| 3,850,590 | 11/1974 | Chalkley et al. | 51/295 |
| 3,954,930 | 5/1976 | Vasilos | 51/309 |
| 4,019,873 | 4/1977 | Reiter | 51/309 |
| 4,024,675 | 5/1977 | Naidich et al. | 51/309 |

*Primary Examiner*—Donald J. Arnold
*Attorney, Agent, or Firm*—Thompson, Birch, Gauthier & Samuels

[57] ABSTRACT

A composition formed from (a.) aluminum oxide and/or a solid solution and/or a multiphase composition of aluminum oxide with one or more other metal oxide(s) and (b.) a metallic alloy and having a microstructure comprising a metallic phase, ceramic phase(s) comprising a reactive metal oxide phase and/or solid solutions containing said oxide, an aluminum oxide phase and/or solid solutions of aluminum oxide with one or more other metal oxides. The metallic alloy contains at least one metal characterized by a ΔG of formation (Gibbs free energy) per mole of oxygen of its oxide that is comparable to or greater than the ΔG of formation (Gibbs free energy) per mole of oxygen of aluminum oxide (133 Kcal/mole oxygen). The grain size of the ceramic phase(s) is less than about 10 microns. Cutting tools formed from these compositions have better operating lives than cutting tools containing tungsten carbide or titanium carbide.

13 Claims, No Drawings

ALUMINUM OXIDE-CONTAINING METAL COMPOSITIONS AND CUTTING TOOL MADE THEREFROM

The Government has rights in this invention pursuant to NSF Contract A01-DMR-73-07632 awarded by the National Science Foundation.

This is a continuation of application Ser. No. 806,239 filed June 13, 1977 now abandoned.

BACKGROUND OF THE INVENTION

This invention relates to novel composites comprising aluminum oxide and/or solid solutions and/or multiphase compositions of aluminum oxide with one or more other metal oxides, a reactive metal oxide phase and/or solid solutions containing said oxide, and a metallic phase and relates to apparatus formed therefrom such as cutting tools and wear and abrasion and oxidation resistant surfaces.

It is known that aluminum oxide has the characteristic of excellent wear resistance. The material is used as cutting tools for metals and for wear resistant surfaces. It is believed that the primary reasons for this characteristic are that aluminum oxide is a hard material which minimizes abrasive wear and because it has a very negative $\Delta G$ of formation which minimizes its thermally activated chemical dissociation and reaction with the workpiece. Aluminum oxide has been used in the form of coatings on conventional carbide tools, said coatings formed by processes such as vapor deposition or sputtering, but the coating is weakly adhered to the substrate which results in the coating being flaked off the substrate. It is known also that the mechanical properties of aluminum oxide can be improved by forming solid solutions with other oxides such as chromium oxide, or by forming multiphase compositions with other oxides such as zirconium oxide. Furthermore, it is known also to form aluminum oxide cutting tools by a sintering or a hot pressing process to form fine grained aluminum oxide which may also include grain boundary pinning additives such as magnesium oxide or tungsten. However, the resultant tools are too brittle for most steel cutting operations and their use is limited to finishing cuts because of their inability to withstand even medium chip loads or vibration between the tool and workpiece without fracture. Attempts have been made to fabricate aluminum oxide based cermets for cutting tools with little success due to the inability to bond aluminum oxide to metals and thereby increase the fracture toughness of the resulting composite.

It would be desirable to provide composites comprising aluminum oxide and/or solid solutions and/or multiphase compositions of aluminum oxide with one or more other metal oxides bonded to a metallic phase, the resultant composite having improved fracture toughness as compared to the aluminum oxide cutting compositions of the prior art. Such compositions would be capable of utilizing the desirable cutting characteristics of aluminum oxide under more severe cutting conditions than is now presently possible.

SUMMARY OF THE INVENTION

In accordance with this invention, there is provided a novel composition formed from aluminum oxide and/or a solid solution and/or multiphase composition containing aluminum oxide and a metallic alloy containing a metal reactive with aluminum oxide. The reactive metal is characterized by a $\Delta G$ of formation per mole of oxygen of its oxide which is equal to or greater than the $\Delta G$ of formation per mole of oxygen of aluminum oxide. The composition has a microstructure comprising the oxide of the reactive metal and/or solid solutions containing said oxide and aluminum oxide and/or solid solutions containing aluminum oxide, each having a grain size less than about 10 microns, and a metallic phase. When used as a cutting tool the composition contains less than about 25 weight percent of the metallic alloy. The composition is useful for making abrasion resistant apparatus such as valves or the like when containing the metallic alloy in concentrations up to about 90 weight percent. The composition is prepared by hot pressing or sintering the aluminum oxide particles and the metallic alloy in a non-oxidizing environment like a vacuum or non-reactive gas under conditions to effect reaction of the reactive metal with aluminum oxide. The resultant composition containing less than about 25 weight percent metallic alloy is eminently useful as a cutting tool.

DETAILED DESCRIPTION OF SPECIFIC EMBODIMENTS

The compositions of this invention are prepared by subjecting a macroscopically homogeneous mixture of aluminum oxide and/or solid solution and/or multiphase oxide composition containing aluminum oxide and metallic alloy to elevated pressure and elevated temperature for a period of time to effect reaction of at least one reactive metal of the alloy with at least one of the oxides. Suitable operating temperatures are from the minimum temperature at which a metallic liquid phase is formed in the process to the melting point of one of the ceramic phases, preferably from about 1300° C. to about 1600° C. When utilizing the preferred operating temperature range, a cutting composition is provided which is stable at the temperatures normally encountered while cutting and which contains the oxide phase(s) having a small grain size of about 5 microns or less. Suitable operating pressures are at least about 1,000 psi, preferably from about 5,000 psi to about 10,000 psi. The mixture is subjected to elevated temperatures and pressures for a period of time to assure reaction of at least one reactive metal of the alloy with aluminum oxide and/or an oxide phase containing aluminum oxide to form the oxide of the reactive metal(s) and aluminum and/or other metals formed by reduction of other oxides present macroscopically homogeneously throughout the composition. It is believed by virtue of this reaction that there exists good bonding between phases. This results in greatly improved fracture resistance of the compositions as compared to presently available aluminum oxide cutting tools to render them particularly adaptable as cutting tools.

When forming cutting tools, the composition treated by the process of this invention contains about 5 to 25 weight percent of the metallic alloy, preferably between about 10 and 15 percent of the metallic alloy. If the weight percent of the alloy is present in less than about 5 weight percent, the resultant composition will be comparably brittle to the aluminum oxide tools of the prior art. If the particular composition contains more than about 25 weight percent of the metallic alloy, the resultant composition is not desirable as a cutting tool since it will be plastically deformed under normal cutting pressures and temperatures. When forming abrasion resistant apparatus such as valves or fuel pump components for slurries, the composition treated by this invention can contain up to about 90 weight percent of the alloy.

This concept involves the use of a reactive metal in the alloy which has a ΔG of formation per mole of oxygen of the oxide greater than that of at least one component of the ceramic phase(s). The use of aluminum oxide as the principal ceramic constituent in this case does not preclude either the addition of other ceramic phases to the referred to aluminum oxide containing ceramic phase or the substitution of other ceramic phases for the referred to aluminum oxide containing ceramic phase. Representative suitable ceramics includes silicon nitride, titanium nitride, titanium oxy-carbide, silicon carbide, and metal nitrides, carbides, borides, oxy-carbides, oxy-nitrides, or the like in general.

The reactive metal of this concept is used to form an oxide contributing to the mechanical properties of the original oxide by virtue of its characteristics of bonding to other phases present, and should be used in proportions so as not to reduce all said original oxide in forming the reactive metal oxide. Thus the final composition contains essentially of from about 10 to 95 weight percent of an oxide composition selected from the group consisting of aluminum oxide, a metal oxide solid solution containing aluminum oxide, a metal oxide multiphase composition containing aluminum oxide, a reactive metal oxide phase, said reactive metal oxide being derived from said metallic phase and having a ΔG of formation per mole of oxygen which is at least equal to the ΔG of formation per mole of oxygen of aluminum oxide, and/or solid solutions containing said oxide, and mixtures thereof of a size less than about 10 microns, and a metallic phase. The aluminum oxide containing component used to form the compositions of this invention can be aluminum oxide or solid solutions or multiphase compositions of metal oxides containing aluminum oxide or mixtures thereof. Representative suitable metal oxides which can form solid solutions or multiphase compositions with aluminum oxide include zirconium oxide, titanium oxide, chromium oxide, hafnium oxide, or the like.

The compositions of this investigation are characterized by a macrostructure which is homogeneous and a microstructure which is non-homogeneous wherein ceramic phases have a grain size less than about 10 microns and preferably less than about 2 microns. The compositions of this invention have a Young's modulus comparable to that of aluminum oxide and have a transverse rupture strength greater than the pure aluminum oxide. If the ceramic phases of the final composition have a grain size greater than about 10 microns its transverse rupture strength is too low for cutting tools since the transverse rupture strength decreases with increased grain size. In order to mix the aluminum oxide particles and powdered metallic alloy sufficiently, they are ground together such as by ball milling, air milling or the like prior to subjecting the mixture to elevated temperatures and pressures.

Representative metals useful as the reactive metal herein are zirconium, hafnium, titanium, chromium, or the like, characterized by more or comparably negative ΔG of formation per mole of oxygen than aluminum oxide. The reactive metal forms an oxide which is a constituent of the final composition. Representative suitable alloy non-reactive components used to form cutting tools comprise metals or alloys with a melting point over about 1000° C. such as nickel, cobalt, or iron.

As noted above, a metallic alloy can contain one or more metals which are reactive with aluminum oxide and likewise, one or more metals that are non-reactive with aluminum oxide.

The following example illustrates the present invention and is not intended to limit the same.

EXAMPLE 1

This example illustrates the process of this invention and sets forth the improved results obtained with the cutting tools formed.

Mixtures of aluminum oxide and nickel-30% zirconium alloy were ball milled for three days. The compositions formed contained 10 weight percent of the alloy based upon the weight of the aluminum oxide-alloy mixture.

The compositions were hot pressed in a mold having a cylindrical configuration for about 5 minutes at a temperature of 1400° C. to 1600° C. and a pressure of 5,000 to 10,000 psi. Hot pressing was conducted in a vacuum of less than about $10^{-3}$ torr. Hardnesses of over 2000 kg/mm² are obtained, with higher resistance to fracture during cutting tests than pure ceramic tools.

The cutting results obtained with the composition formed herein are compared with the results obtained with the conventional General Electric 210 tool (TiC in Ni-Mo formed by sintering) and the conventional General Electric-030 tool ($Al_2O_3$, 10–15 wt. % TiC formed by hot pressing).

The results in Table 1 were obtained in cutting 4340 steel with a 0.050 inch depth of cut, 0.005 inches per revolution feed rate and a speed of 1000 surface feet per minute in a lathe.

TABLE 1

| TOOL | CRATER DEPTH | TIME |
|---|---|---|
| GE 210 | .00056 inch | 4 min. |
|  | .00085 inch | 7 min. 45 sec. |
|  | .0012 inch | 11 min. 20 sec. |
|  | .0014 inch | 14 min. 30 sec. |
| $Al_2O_3$-(Ni, 30%-Zr alloy) | .00023 inch | 4 min. 5 sec. |
|  | .0003 inch | 4 min. 25 sec. |
|  | .00034 inch | 5 min. |
|  | .00045 inch | 8 min. 45 sec. |
|  | .00048 inch | 9 min. 15 sec. |
|  | .00055 inch | 10 min. 15 sec. |
|  | .0007 inch | 12 min. 40 sec. |
|  | .00074 inch | 14 min. 5 sec. |
| GE-030 | .00034 inch | 5 min. 40 sec. |
|  | .00038 inch | 6 min. 25 sec. |
|  | .00043 inch | 6 min. 35 sec. |
|  | .00104 inch | 12 min. 50 sec. |
|  | .0011 inch | 13 min. 5 sec. |
|  | .00132 inch | 27 min. 20 sec. |

We claim:

1. A shaped article formed from a macroscopically homogeneous composition consisting essentially of (a) from about 10 to 95 weight percent of an oxide composition selected from the group consisting of aluminum oxide, a metal oxide solid solution containing aluminum oxide, a metal oxide multiphase composition containing aluminum oxide, (b) a metallic phase and (c) a reactive metal oxide phase, said reactive metal oxide being formed from a first metal derived from said metallic phase, said first metal being reactive with aluminum oxide under the conditions of formation of said composition wherein said reactive metal oxide has a ΔG of formation per mole of oxygen which is at least equal to the ΔG of formation per mole of oxygen of aluminum oxide, the grain size of said oxide composition being less than about 10 microns.

2. The shaped article of claim 1 wherein the oxide composition has a grain size less than about 2 microns.

3. The shaped article of claim 1 wherein said reactive metal is zirconium.

4. The shaped article of claim 1 wherein said reactive metal is titanium.

5. The shaped article of claim 1 wherein said reactive metal is hafnium.

6. The shaped article of claim 1 wherein said reactive metal is chromium.

7. The shaped article of claim 1 wherein said composition contains between about 5 and 10 weight percent of said metallic phase.

8. A cutting tool having as its exposed cutting surface the composition of claim 1 containing less than about 25 weight percent of the metallic phase.

9. A cutting tool having as its exposed cutting surface the composition of claim 2 containing less than about 25 weight percent of the metallic phase.

10. A cutting tool having as its exposed cutting surface the composition of claim 3 containing less than about 25 weight percent of the metallic phase.

11. A cutting tool having as its exposed cutting surface the composition of claim 4 containing less than about 25 weight percent of the metallic phase.

12. A cutting tool having as its exposed cutting surface the composition of claim 5 containing less than about 25 weight percent of the metallic phase.

13. A cutting tool having as its exposed cutting surface the composition of claim 6 containing less than about 25 weight percent of the metallic phase.

* * * * *